(12) United States Patent
Larson et al.

(10) Patent No.: US 9,126,544 B2
(45) Date of Patent: Sep. 8, 2015

(54) INTEGRATED POWER SYSTEM FOR DELIVERY OF POWER TO A VEHICLE ACCESSORY

(75) Inventors: Gerald Larson, Fort Wayne, IN (US);
Larry Peterson, Rice Lake, WI (US);
Patrick McCabe, Rice Lake, WI (US)

(73) Assignee: Johnson Truck Bodies, LLC, Rice Lake, WI (US)

( * ) Notice: Subject to any disclaimer, the term of this patent is extended or adjusted under 35 U.S.C. 154(b) by 543 days.

(21) Appl. No.: 12/875,378

(22) Filed: Sep. 3, 2010

(65) Prior Publication Data

US 2012/0056474 A1    Mar. 8, 2012

(51) Int. Cl.
| | | |
|---|---|---|
| *B60L 1/00* | (2006.01) | |
| *B60L 3/00* | (2006.01) | |
| *H02G 3/00* | (2006.01) | |
| *B60R 16/03* | (2006.01) | |
| *H02J 1/14* | (2006.01) | |
| *B60K 6/28* | (2007.10) | |
| *G05B 11/01* | (2006.01) | |

(52) U.S. Cl.
CPC . *B60R 16/03* (2013.01); *H02J 1/14* (2013.01); *B60K 6/28* (2013.01); *G05B 11/01* (2013.01); *Y02T 10/92* (2013.01)

(58) Field of Classification Search
CPC . Y02T 10/7005; Y02T 10/7077; B60R 16/03; B60R 16/0315; B60L 11/14; B60L 8/00; B60L 1/00; F16H 47/04; B60H 1/32; B60K 6/28; B60K 16/00; B60K 25/06; G05B 11/01; B28C 5/18

USPC ........ 700/22, 297; 62/77, 236; 307/9.1, 10.1; 701/29.1; 475/79, 78, 74; 180/65.22, 180/53.8, 65.4, 2.2; 320/124; 366/61

See application file for complete search history.

(56) References Cited

U.S. PATENT DOCUMENTS

| | | |
|---|---|---|
| RE19,759 E | 11/1935 | Davis |
| 2,479,170 A | 8/1949 | Keumpel |
| 2,694,553 A | 11/1954 | Hicke et al. |
| 3,515,968 A | 6/1970 | Crawford |
| 3,976,458 A | 8/1976 | Krug |
| 4,947,657 A | 8/1990 | Kalmbach |
| 5,272,879 A | 12/1993 | Wiggs |
| 5,555,732 A | 9/1996 | Whiticar |
| 5,558,173 A * | 9/1996 | Sherman ................ 180/53.8 |
| 6,361,463 B1 * | 3/2002 | Kojima ..................... 475/79 |
| 6,543,245 B1 * | 4/2003 | Waldschmidt et al. ......... 62/239 |
| 6,598,691 B2 | 7/2003 | Mita et al. |
| 6,688,125 B2 | 2/2004 | Okamoto et al. |

(Continued)

FOREIGN PATENT DOCUMENTS

WO    2010/002644    1/2010

OTHER PUBLICATIONS

Office Action dated Apr. 17, 2013 for pending Canadian Patent Application No. 2,751,765.

*Primary Examiner* — Rexford Barnie
*Assistant Examiner* — Jagdeep Dhillon
(74) *Attorney, Agent, or Firm* — Nelson Mullins Riley & Scarborough LLP

(57) ABSTRACT

The integrated power system provides for the integration of multiple sources of power for powering a vehicle accessory. The integrated power system provides a power sharing connection which provides for a balance of the load current demanded by the vehicle accessory. As a result, excessive engine loading is avoided.

18 Claims, 4 Drawing Sheets

(56) References Cited

U.S. PATENT DOCUMENTS

| | | |
|---|---|---|
| 6,815,927 B2 | 11/2004 | Ikeda |
| 6,942,375 B2 * | 9/2005 | Chanasyk et al. ............. 366/61 |
| 6,981,820 B2 | 1/2006 | Nelson |
| 7,145,788 B2 | 12/2006 | Plummer |
| 7,231,959 B2 | 6/2007 | Larson |
| 7,290,592 B2 | 11/2007 | Larson |
| 7,443,048 B2 | 10/2008 | Bernardi et al. |
| 7,740,092 B2 * | 6/2010 | Bender ...................... 180/65.29 |
| 7,960,857 B2 * | 6/2011 | King ........................... 307/10.1 |
| 8,295,950 B1 * | 10/2012 | Wordsworth et al. ........... 700/22 |
| 2003/0115894 A1 | 6/2003 | Podtchereniaev et al. |
| 2004/0220701 A1 | 11/2004 | Maiwald et al. |
| 2006/0025917 A1 | 2/2006 | Pandey et al. |
| 2007/0209378 A1 | 9/2007 | Larson |
| 2008/0011007 A1 | 1/2008 | Larson et al. |
| 2010/0170727 A1 * | 7/2010 | Hsu et al. ....................... 180/2.2 |
| 2010/0180614 A1 | 7/2010 | Larson et al. |

\* cited by examiner

INTEGRATED POWER SYSTEM FOR DELIVERY OF POWER TO A VEHICLE ACCESSORY

FIELD OF THE INVENTION

This invention is generally directed to an integrated power system for delivery of power to a vehicle accessory. The integrated power system is designed to efficiently provide power to the accessory without overloading the vehicle engine and without requiring the use of an auxiliary engine.

BACKGROUND OF THE INVENTION

Commercial vehicles are often equipped with user added vehicle accessories. In the past, these vehicle accessories were powered from the vehicle original equipment manufacturer (OEM) electrical system without strain on the vehicle's power system. As power requirements for vehicle accessories have grown, the OEM electrical system capacity is sometimes exceeded. Often these accessories require a significant amount of energy consumption which results in excessive loading on the vehicle engine.

The power demands for driving systems which also include other power consuming devices such as vehicle accessories must be managed properly in order to avoid impact to the driving operation of the vehicle. One method for dealing with the excess power demands has been to use an auxiliary engine such as a diesel powered auxiliary engine to provide electrical power to the vehicle accessories. The vehicle engine supports parasitic loads such as, for example, fuel injection, oil pump, water pump etc. Power generation utilizing an auxiliary engine will duplicate these parasitic losses resulting in reduced fuel efficiency and increased maintenance costs.

Another method for dealing with these excess power demands is described in U.S. Pat. No. 7,290,592. The energy management system of the U.S. Pat. No. 7,290,592 describes an energy management system involving the replacement of engine belt or engine direct driven components with electrical motors. For example, the system of U.S. Pat. No. 7,290,592 contemplates replacement of a main fan unit with smaller single function electrical fan components and replacement of larger multipurpose heat exchanger such as the vehicle radiator with smaller single function heat exchangers associated with the smaller electric fans. This energy management system requires significant modifications to the engine electrical systems and cooling system. Another disadvantage to this system is the capacity of the system. The system's large power requirements necessitate large and heave intermediate components. Finally, the energy management system described in U.S. Pat. No. 7,290,592 does not provide power source functionality appropriate for high energy efficient mobile refrigeration.

Another method for dealing with energy demands for accessory equipment is described in U.S. Pat. No. 7,443,048. U.S. Pat. No. 7,443,048 describes a method for operating an electrical system including a power-distribution network having first and second portions with power loads connected thereto. The '048 patent provides for a load-priority cycle for supplying power of the first and second portions of the network. The '048 patent also describes power-supply controls to adjust an output voltage of the power converter. Finally, the '048 patent describes a machine which includes a driving system and an electrical system. The electrical system may include one or more power sources and a power distribution network with a first portion connected to one or more of the power sources and a second portion connected to one or more of the power sources. The disadvantage of the systems described in the '048 patent are that the system of the '048 patent does not consider load management under transient conditions. In addition, the '048 patent does not describe power source functionality and prioritization as appropriate for high efficiency mobile refrigeration.

The present invention provides an integrated power system which overcomes the problems presented in the prior art and which provides additional advantages over the prior art, such advantages will become clear upon a reading of the attached specification in combination with a study of the drawings.

SUMMARY OF THE INVENTION

Briefly, the present invention discloses an integrated vehicle power system which is utilized to provide power to the vehicle's accessories. Power is provided to the accessory from an engine driven generator, a battery package, shore power and in some instances from the vehicle's electrical system. The integrated power system provides for the delivery of power to the vehicle's accessory while minimizing impact to vehicle engine performance.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
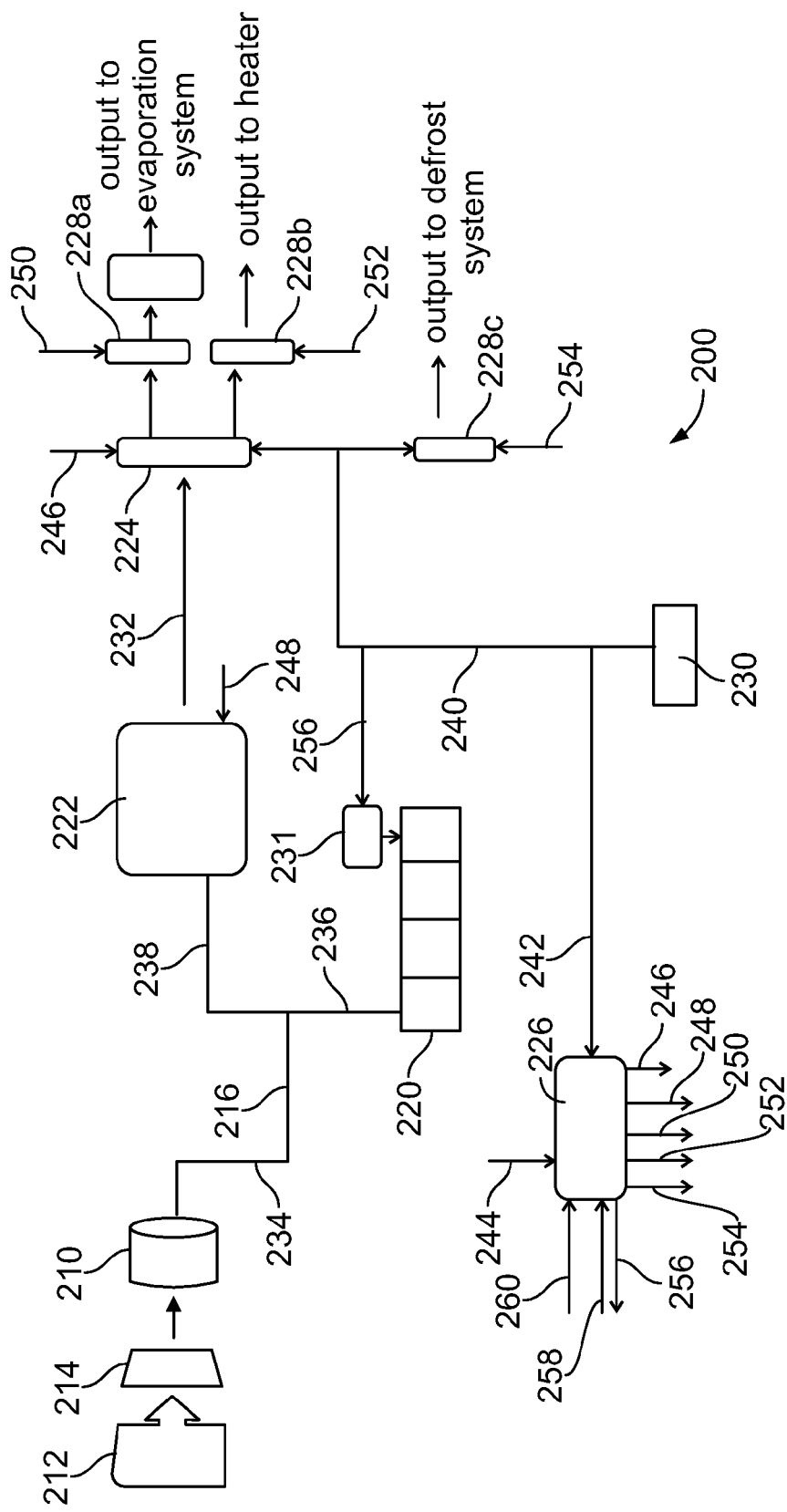
FIG. 1 illustrates a first embodiment of the integrated power system of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The integrated power system 200 illustrated in FIG. 1 is utilized in connection with a vehicle and a powered vehicle accessory. The powered vehicle accessory may be, for example, an isolated cold plate refrigeration system, such as the system described in Applicants patent application entitled "Isolated Cold Plate Refrigeration System With User Selected Temperature Control", the disclosure of which is herein incorporated by reference. Other accessories which can be operated in connection with the integrated power system include, for example, electric heating elements for controlling the interior temperature of a refrigerated truck body during very cold ambient temperature conditions.

The integrated power system 200 integrates power from multiple sources and provides an energy- efficient and cost efficient system for powering the vehicle accessory. The sources of power integrated by the integrated power system include the utility grid, the vehicle engine driven generator, a battery package, and in some cases the vehicle electrical system. As shown in FIG. 1, the integrated power system generally includes a generator 210, a power take off (PTO) device 212, a speed changer 214, a power sharing connection 216, a battery package 220, an inverter 222, a transfer switch 224, a system controller 226, contactors 228a, 228b, 228c a shore power connector 230, and a charger 232. The generator provides for connection of the integrated power system 200 to the vehicle's engine. More specifically, the PTO 212 is mounted to the transmission of the vehicle's engine to utilize the vehicle engine as a source of power. The speed changer 214 is mounted to the PTO 212 and provides for adjustment of the RPMs delivered from the PTO 212 to the generator 210. The generator 210 can be, for example, a 28 Volt DC generator. Alternatively the generator 210 can be directly mounted to the engine transmission without the use of the PTO 212 and the speed changer. The generator 210 provides a source of power for operation of the vehicle accessory as will be described herein.

The battery package 220 is, for example, a 24 Volt DC lead acid battery package. The battery package 220 provides a source of power for operation of the accessory system as will be described herein. Although the battery package 220 is described herein as a lead acid battery package, it is to be understood that other conventional battery packages can be utilized, such as, for example, lithium or nickel metal battery packages. Alternatively still, the battery package can be provided by a super capacitor.

The inverter 222 provides for inversion of the DC power supplied by the generator 210 and the battery package 220 to a three-phase AC power signal 232. The AC power signal 232 provided by the inverter, is for example, a 230 Volt three-phase AC power signal 232.

The power sharing connection 216 is provided by a generator cable 234, a battery cable 236 and a DC power bus 238. The generator cable 234 extends from the output of the generator 210 to the battery cable 236 and the DC power bus 238; the battery cable 236 extends from the battery package 220 to the DC power bus 238; and the DC power bus 238 extends from the generator cable 234 and the battery cable 236 to the inverter 222. The generator cable 234 delivers DC power provided from the generator 210 to the DC power bus 238 and the battery package 220, the battery cable 236 provides DC power from the battery package 220 to the DC power bus 238 and delivers DC power from the generator cable 234 to the battery package 220. The DC power bus 238 carries DC power provided by the generator 210 and the battery package 220 to the inverter 222. The generator cable 234 has a greater resistance than the battery cable 236. The greater resistance of the generator cable 234 is achieved, for example, by providing a generator cable 234 which has a smaller diameter than the battery cable 236. Alternatively, the generator cable 234 may be longer than the battery cable 236 to provide a greater resistance.

The shore power connector 230 provides for connection of the integrated power system 200 to the utility grid (not shown). The shore power connector 230 provides for the delivery of AC power to a utility grid power cable 240 of the integrated power system 220. The utility grid power may be, for example, 240 VAC single phase or 230 VAC three phase power.

The transfer switch 224 receives AC power from either the inverter 222 or from the utility grid via the shore power connector 230 and delivers the AC power to the contactors 228a, 228b, 228c. The transfer switch 224 is a conventional contactor, for example, a double connector such as those used to start and run electrical motors. The transfer switch 224 provides isolation between the shore power connector 230 and the inverter 222. As a result, AC power is delivered to the connectors 228a, 228b, 228c from either the inverter 222 or the shore power connector 230 but is never provided to the contactors 228a, 228b, 228c from the inverter 222 and the shore power connector 230 simultaneously. This isolation is ensured by a "break before make" sequence of the system controller 226 as will be described herein.

The contactors 228a, 228b, 228c provide for electrical connection between the power sourced via the integrated power system 200 and the accessory system (not shown) to be powered. In the example of the refrigeration accessory the first contactor 228a provides an electrical connection between the transfer switch 221 and an evaporation system; the second contactor 228b provides an electrical connection between the transfer switch 224 and a heater; and the third contactor 228c provides an electrical connection between the transfer switch 224 and a defroster system 231.

The charger 231 is provided in electrical communication with the shore power connector 230 via the utility grid power cable 240 and is in electrical communication with the battery package 220.

The system controller 226 includes a number of input connectors for receiving input signals 242,244 and a number of output connectors for providing output signals 246,248, 250,252,254,256 in response to the input signals 242,244. The first input connector of the controller 226 receives a shore power input signal 242. A first output connector of the controller 226 provides a transfer switch signal 246 to the transfer switch 224; a second output connector of the controller 226 provides a demand signal 248 to the inverter 222; a third output connector of the controller 226 provides a first contactor signal 250 to the first contactor 228a; a fourth output connector of the controller 226 provides a second contactor signal 252 to the second contactor 228b; a fifth output of the controller 226 provides a third contactor signal 254 to the third contactor 228c; and a sixth output of the controller 226 provides a charger signal 256 to the charger 231.

Configuration of the controller 226 is determined by the input signals and output signals required to operate the vehicle accessory to be powered by the integrated power system 200. When the integrated power system 200 is utilized in connection with the cold plate refrigeration system accessory as described herein, an input connector of the controller 226 receives a cargo compartment temperature signal 244, an input connector of the controller 226 receives a evaporation system demand signal 258; and an input connector of the controller 226 receives a defrost system demand signal 260.

Operation of the integrated power system will now be described. As noted above the integrated power system is used in connection with a vehicle and a vehicle accessory and therefore for ease of discussion, operation of the integrated power system 200 is described in connection with a vehicle having an isolated cold plate refrigeration system accessory.

Figure 2:
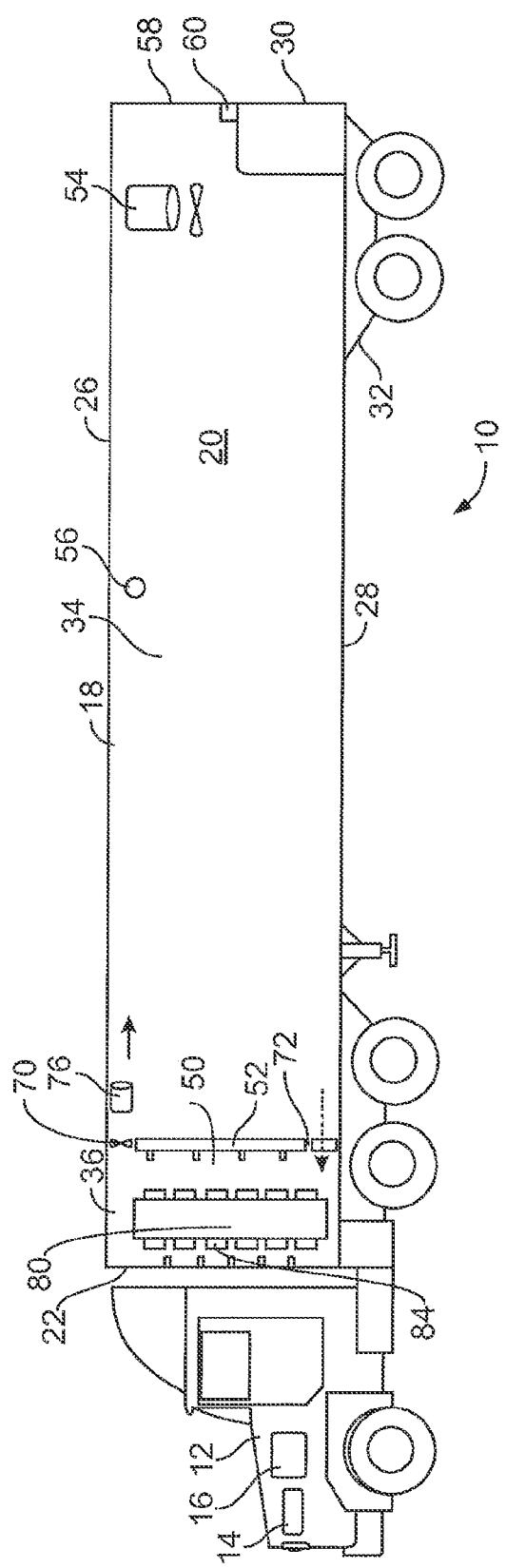
FIG. 2 illustrates a vehicle and vehicle accessory for which the integrated power system of FIG. 1 can be utilized.

As illustrated in FIG. 2, the vehicle generally includes a cab which houses the engine 14 and a transmission 16 and a body 18 for transporting goods. The body 18 generally defines a cargo compartment 34 and a cold plate compartment 36. The temperature controlled cargo compartment 34 is typically used to house goods to be maintained at a designated target temperature which is typically lower than the ambient temperature. A recirculation fan 54 and a temperature sensor 56 are positioned within the cargo compartment 34. A cargo compartment access door 58 is provided in a rear wall to provide access to the cargo compartment 34 and to alloy for loading and unloading of goods to and from the cargo compartment 34. A cargo compartment access door switch 60 is provided in communication with the cargo compartment access door 58.

An evaporation system and a heater system are provided in communication with the cargo compartment 34. The evaporation system can be, for example, a typical evaporation system commonly used in connection with a refrigeration vehicle. The evaporation system generally includes a compressor, a condenser, and an evaporator with an expansion valve.

A partition wall 52 isolates the cargo compartment 34 from the cold plate compartment 36. The partition wall 52 defines a first passageway 70 for the passage of air from the cold plate compartment 36 to the cargo compartment 34 and a second passageway 72 for the passage of air from the cargo compartment 34 to the cold plate compartment 36. A first door is provided in connection with the first passageway 70 and a second door is provided in connection with the second passageway 72. A cold plate fan 76 is provided in connection with the first passageway 70.

The cold plate compartment 34 houses the cold plate 80. The cold plate 80 is mounted within the cold plate compartment 34. A defrost system is provided in connection with the cold plate 80. The defrost system generally includes a defrost tube 84, a heater, and a pump.

The sources of power integrated by the integrated power system and sourced to the vehicle accessory include: power provided by the utility grid, which is often referred to as shore power; power provided by the electrical generator 210 which is driven by the vehicle engine's transmission; and power provided by the battery package 220. Although the vehicle's electrical system is not integrated in the integrated power system illustrated in FIG. 1, it is to be understood that for some vehicle accessories, integration of the vehicle's electrical system, in addition to the other sources of power is appropriate.

The integrated sources of power are first used to prepare the integrated power system and the vehicle accessory (i.e. the refrigeration system) for use (i.e. for a pickup and/or delivery route). Preparation begins by connecting the integrated power system 200 to the utility grid utilizing the shore power connector 230. With this connection made, AC power is delivered to the integrated power system 200 to bring the integrated power system 200 and the accessory to a state of readiness. The AC power delivered by the utility grid is 240 VAC single phase or 230 VAC three phase power.

Upon connecting the shore power connector 30 to the utility grid, the shore power input signal 242 is provided to the system controller 226 and in return, the system controller 226 provides a transfer switch signal 246 to the transfer switch 224 which indicates that connection between the inverter 222 and the contactors 228a, 228b, 228c is to be terminated and connection between the utility grid power cable 240 and the contactors 228a, 228b, 228c is to be made. This sequence of breaking the connection with the inverter 222 prior to making the connection with the utility grid is referred to as a "break-before-make" sequence. With the connection to the utility grid made through the shore power connector 230 therefore, power is no longer provided to the contactors 228a, 228b, 228c from the inverter 222 and any power to be provided to the contactors 228a, 228b, 228c will be sourced from the utility grid. The transfer switch 224, therefore, isolates the inverter 222 from the utility grid. The break-before-make sequence has been described as being implemented by the controller 226, alternatively, the break-before-make sequence can be accomplished electro-mechanically through the use of relays.

Preparation of the refrigeration system may require that the temperature of cargo compartment 34 be maintained at a target temperature, for example, if goods to be kept at a relatively cool condition are already loaded in the vehicle and the temperature of those goods must be maintained while the integrated power system 200 and the accessory are undergoing preparations. In this case a cargo compartment temperature is provided to the controller 226 and the controller 226 in response provides a first contactor signal 250 to close the first contactor 228a. Upon closing the first contactor 228a, power from the utility grid will be provided to the evaporation system to reduce the temperature of the cargo compartment 34. Alternatively if the ambient temperature is lower than target temperature, the cargo compartment temperature is provided to the controller 226 and the controller in response provides a second contactor signal 252 to close the second contactor 252. Upon closing the second contactor 228b, power from the utility grid will be provided to the heater system to raise the temperature of the cargo compartment 34.

When the target temperature of the cargo compartment 34 will likely require the use of the cold plate 80 during the vehicle's route, preparation of refrigeration system also requires that the cold plates 80 are charged, i.e. the cold plates 80 are brought to eutectic condition. If charging of the cold plates 80 is required, the system controller 226 will receive a signal 258 from the evaporation system at the controller input. In response, the controller 226 will provide an output signal 250 to the first contactor 228a to close the first contactor 228a. Upon closing of the first contactor 228a, AC power from the utility grid power is provided to the evaporation system to recharge the cold plates 80.

Preparation of the integrated power system 200 includes ensuring that the battery package 220 is fully charged. The system controller 226 provides a charger control signal 256 to the charger 231 thereby providing utility grid power to the battery package 220 to recharge the battery package 220.

Preparation of the integrated power system 200 and preparation of the refrigeration system 50 may require maintenance of the temperature of the cargo compartment 34, recharging of the cold plates 80 and recharging of battery package 220. Since simultaneous demand for power for these operations may exceed the ratings of the available utility grid circuit, either line current monitoring or sequential power sourcing is utilized. For example, power is first applied to the evaporation system to maintain the cargo compartment temperature, then power is applied to the evaporation system to charge the cold plates 80 to eutectic condition, and finally power is applied to charge the battery package 220.

Once preparation of the vehicle accessory and the integrated power system 200 is complete, the shore power connector is disconnected from the utility grid thereby disconnecting the integrated power system 200 from the utility grid and the vehicle 10 is ready for transportation of goods.

When the vehicle 10 is in operation, intermittent demands for power will be made by the vehicle accessory, i.e. by the refrigeration system 50. For example, power may be needed to operate the recirculation fan 54 or the cold plate fan 76. Because the recirculation fan 54 and the cold plate fan 76 require DC power, a DC power connection (not shown) is provided at the output of the generator 210 and power is provided to the fans 54,76 as required. Intermittent demands for power will also be made the evaporation system. These demands will he made in response to a need to reduce the temperature of the cargo compartment 34 or to re-charge the cold plate 80. When the vehicle 10 is in operation, power required. to operate the evaporation system is provided through the inverter 22. Upon receipt of an input signal 258 indicating a need to operate the evaporation system, the controller 226 will provide a number of output signals. The controller 226 provides a transfer switch signal 246 to the transfer switch 224 indicating that power is to be provided from the inverter 222 to the contactors 228a, 228b, 228c; a first contactor signal 250 is provided to the first contactor 228a to close the first contactor 228a, and the demand signal 248 is provided to the inverter 222 to activate the inverter 222. It is noted that it is preferable that the demand signal 248 is provided to the inverter 222 subsequent to switching of the transfer switch 224 and the first contactor 228a. By using this sequencing, arcing is avoided at the contactor 228a and the life of the contactor 228a is prolonged.

The demand for power received by the inverter 222 may result in a significantly high switched electrical load, for example 20 HP. If this switched electrical load was borne solely by the engine driven generator 210, a noticeable impact to engine operation and vehicle driveability would likely result. To avoid this impact on engine operation, the integrated power system 200 provides for a shared sourcing of power to the inverter 222 through the power sharing connection 216, i.e. the demand for power is met by both the generator 210 and the battery package 220.

Not only is power to the inverter 222 sourced by the engine driven generator 210 and the battery package 220, the percentage of power sourced from the generator 210 relative to the percentage of power sourced from the battery package 220 is determined by the relative resistance of the connections provided from each source to the load. As described above, a battery cable 236 extends from the battery package 220 to the DC power bus 238 and a generator cable 234 extends from the generator 210 to the DC power bus 238. The impedance of the battery cable 236 is lower than the impedance of the generator cable 234, therefore a greater percentage of the power demanded will be provided by the battery package 220 than by the generator 210.

Figure 3:
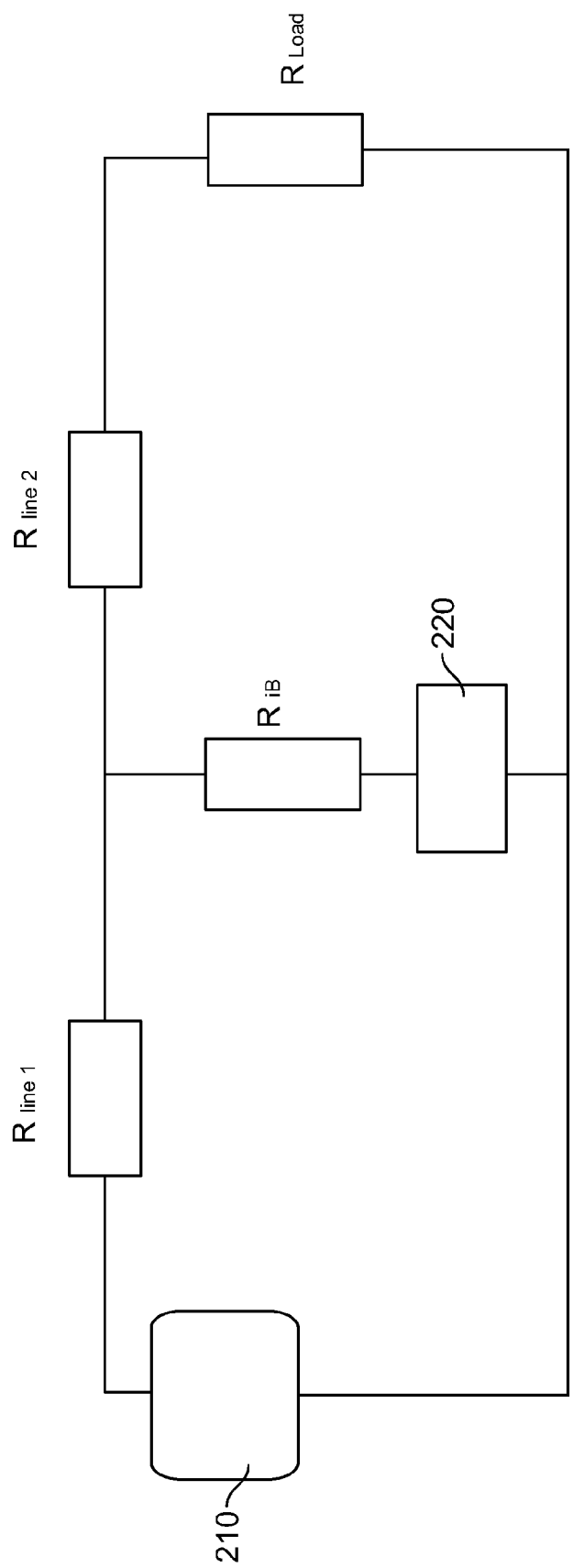
FIG. 3 illustrates the power sharing arrangement provided by the integrated power system of FIG. 1.

FIG. 3 illustrates the balancing of the load provided by the power sharing connection 216. As noted above, the generator is a 28 Volt DC generator and the battery package is a 24 Volt DC battery package. For example, the resistance provided by the components of the power sharing connection are as follows: the resistance of the generator cable 234 ($R_{line1}$) is 0.0016 Ohms; the resistance of the battery cable 236 ($R_{line2}$) is 0.0008 Ohms; the resistance of the load ($R_L$) is 0.07 Ohms; and the internal resistance of the battery 220 ($R_{IB}$) is 0.002 Ohms. In this scenario, approximately 60% of the load current will be provided by the generator 210 and approximately 40% of the load current will be provided by the battery package 220.

If it is desired that the load current provided by the generator 210 is further reduced so as to further minimize the impact on the engine 14, the resistance of the generator cable 234 relative to the resistance of the battery cable 236 can be further increased. For example, the resistance of the generator cable ($R_{line1}$) can be increased to 0.0032 Ohms. With all other resistance remaining the same, this change in the resistance of the generator cable 234 will result in approximately 40% of the load current being provided by the generator 210 and 60% of the load current being provided by the battery package 220. By varying the relative resistances of the battery cable 236 and the generator cable 234, nearly any power sharing percentages can be achieved. The reduction in load current to be sourced by the generator 210 will result in a reduction in the demand placed on the vehicle's engine 14 and therefore the impact to engine performance caused by supplying power to the vehicle's accessory, will be reduced.

As noted above, the power sourced to the inverter 222 through the power sharing connection 216 is provided to the evaporation system through the first contactor 228a. Once the demand for power by the evaporation system ceases, the controller 226 again provides output signals. First, a demand signal 248 is provided to the inverter 222 to indicate that the need for power has ceased and the inverter 222 is turned off. Next, the controller 226 provides a signal to the first contactor 228a and the first contactor 228a is opened. By discontinuing the supply of power to the evaporation system in this sequence, i.e. by turning the inverter 222 off prior to opening the first contactor 228a, arching at the first contactor 228a is avoided thereby prolonging the life of the contactor 228a.

Once power to the evaporation system is terminated, DC power previously provided by the generator 210 to the inverter is now diverted to the battery package 220 to recharge the battery package 220.

The combined loading consisting of operation of the evaporation system and charging of fully discharged batteries results in a very high engine power demand. This high engine power demand is undesirable and therefore should be avoided by beginning operation of the integrated power system 200 and the accessory system 50 with a fully charged battery package 220. In addition, the charge on the battery package 220 should be maintained throughout operation of the vehicle 10 to avoid fully discharging the battery package 220.

Other demands for power may occur during operation of the vehicle 10. If, for example, the controller 226 receives a signal from the temperature sensor 56 indicating a need to increase the temperature of the cargo compartment 34, a second contactor signal 252 is provided to the second contactor 228b to close the second contactor 228b; a transfer switch signal 246 is provided to the transfer switch 224 to allow for the flow of power from the inverter 222 to the second contactor 228b; and a demand signal 248 is provided to the inverter 222 to turn on the inverter 222. As a result, DC power provided to the inverter 222 is converted to AC power and is provided to the heater through the transfer switch 224 and the second contactor 228b to operate the heater and heat the cargo compartment 34.

Upon completion of the delivery/pick-up route, the vehicle 10 is returned to its home base and reconnected to the utility grid through the shore power connector 230. Electric power derived from the utility grid provides cost efficient power which can be managed with the lowest losses. As noted above, upon connection of the shore power connector 230 to the utility grid, a shore power connection signal 242 is provided to the controller 226. In response the system controller 226 initiates a break-before-make sequence by providing an output signal 250 to the transfer switch 224 indicating that the power from the inverter 222 to the transfer switch 224 is to be terminated. Once power from the inverter 222 to the transfer switch 224 has been terminated, power from the utility grid via the shore power connector 230 can be provided to the contactor 228a, 228b, 228c.

In the event that frost has accumulated on the cold plates 80 during the route, the system controller 226 receives a defrost input signal 260 from the defrost system. In response, the controller 226 provides a signal to the third contactor 228c, to close the third contactor 228c, thereby providing utility grid power to the defroster to defrost the cold plate 80.

Once the cold plate 80 has been defrosted, the preparation operations are again employed to ready the vehicle 10 and the integrated power system 200 for another pick-up/delivery route, i.e. cargo compartment 34 is brought/maintained at the target temperature, the cold plate 80 is recharged, and the battery package 220 is recharged.

In addition to providing shared power sourcing, the integrated power system 200 prioritizes the sources of power available and the integrated power system 200 provides prioritization of the distribution of power to the vehicle accessory system. The prioritization of power sources and power distribution is provided by the controller 226 and the configuration of controller 226 is determined by the vehicle accessory system to be operated.

Prioritization of Power Sources

In the instance where the vehicle accessory is a refrigeration system 50, three sources of power are provided and integrated by the integrated power system 200; power from the utility grid; power from the engine driven generator 210; and power from the battery package 220. The integrated power system 200 prioritizes these power sources. The highest priority for sourcing power to the vehicle accessory is given to the utility grid as it provides the best cost efficiency and can be managed with the lowest losses. Thus, when connection is provided to the utility grid, the power requirements will be met with power from the utility grid rather than power from the generator 210 or the battery package 220. This transfer of power from the utility grid to the integrated power system and the accessory system provides better efficiency than the transfer of power from the other sources. Of course, however, power sourced from the utility grid is only available when connection to the utility grid is possible, i.e. when the vehicle is at a home base.

The next priority for sourcing power is the engine driven electrical generator 210. This power source is of course available even when the vehicle is away from the home base and connection to the utility grid is not possible. A vehicle diesel engine, for example, is operational in the BSFC regime and therefore provides efficiency in the order of 0.39 Lb/HP-hr. Thus, electrical power sourced from a generator driven by the vehicle's engine provides greater efficiency than use of an auxiliary engine. In addition, utilizing the engine driven electrical generator 210 rather than an auxiliary generator will avoid duplication of the parasitic losses as discussed above, thereby resulting in increased fuel efficiency and decreased maintenance costs.

The next priority for sourcing energy is the battery package 220. The battery package 220 can be either a long term storage system or a short term storage system. Examples of long term storage systems include conventional battery packages such as lead acid, lithium, or nickel metal systems. An example is a short term storage system is a super capacitor. Although the conventional battery packages are characterized by losses due to internal impedances which are encountered when charging and discharging the batteries, the conventional battery packages are capable of storing energy for longer durations with relatively little deterioration. These conventional battery systems, therefore, are an ideal supplement for high efficiency, limited duration energy storage mediums such as, for example, a cold plate 80. Long term and short term battery systems provide an essential function of the integrated power system 200. These battery systems provide an energy source having a very high current capability with low internal resistance and are particularly useful for starting loads such as that provided by the evaporation system where initial start-up (surge power) demands greatly exceed engine driven generator capabilities.

Although not utilized to source power to the refrigeration system 50, in some instances, final priority for sourcing power is provided by the vehicle electrical system which includes the battery utilized to start the vehicle's engine 14. The vehicle electrical system can be utilized as a source of power to the integrated power system 200, however, because of the potential that sourcing power to the accessory system will result in vehicle "down time" the vehicle electrical system should be considered the lowest priority power source. When the accessory system to be powered is a refrigeration system 50, ideally the vehicle accessory 50, will operate independently of the vehicle electrical system. This independence will ensure that the vehicle 14 will not experience "down time" due to accessory system power demands.

Prioritization of Power Distribution

With the shore power connection made power distribution to the integrated power system 200 and the accessory system 50 is prioritized. In the case of the refrigeration system accessory 50 as follows: the first priority for distribution of shore power is maintenance of the cargo compartment 34 temperature; the next priority for distribution of shore power is defrosting of the cold plate 80; the next priority for distribution of shore power is charging of the cold plate 80 to restore the cold plate 80 to its eutectic temperature; the final priority for distribution of shore power is charging of the battery package 220. Because eutectic mediums (including water) have an energy density (energy per unit weight) that exceeds that of conventional batteries and various other means for energy storage, recharging of the cold plate 80 via the electrical grid power is identified as a higher priority level than re-charging of the battery package 220.

Figure 4:
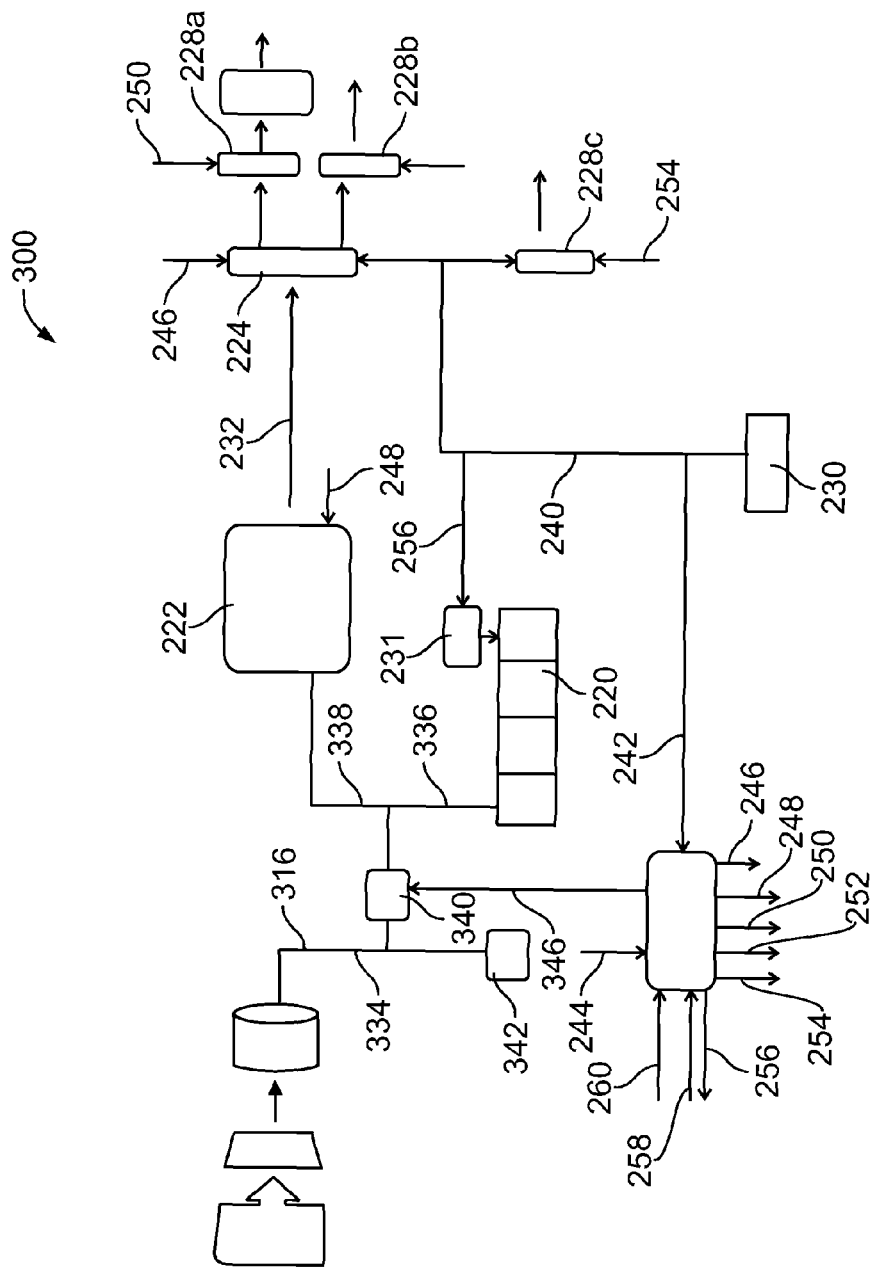
FIG. 4 illustrates an alternate embodiment of the integrated power system of the present invention.

An alternate embodiment of the integrated power system is illustrated in FIG. 4. The integrated power system is identical to the integrated power system of FIG. 1 except as described herein.

Unlike the power sharing connection 216 of the integrated power system 200 which includes a generator cable 234 and a battery cable 236 having different resistances for the purpose of providing a power sharing arrangement, the integrated power system 300, includes a power sharing connection 316. The power sharing connection 316 includes a generator cable 334, a battery cable 336, a DC power bus 338, a power sharing switch 340 and a stabilization battery 342.

The generator cable 334 extends from the generator 210 to the DC power bus 338. The power sharing switch 340 is provided along the generator cable 334. When in the closed position, the power sharing switch 340 allows DC power from the generator 210 to be provided to the DC power bus 338 (and ultimately to the inverter 222) and to the battery package 220. When the power sharing switch 340 is opened the battery package 220 and inverter 222 are isolated from the generator 210. The stabilization battery 342 is provided at the output of the generator 210. The stabilization battery 342 provides a load at the output of the generator 210 when the power sharing switch 340 is in the open position. It is to be understood that use of the stabilization battery 342 is optional and many generators do not require the use of a stabilization battery 342.

The battery cable 334 extends from the battery package 220 to the DC power bus 338. The DC power bus 338 extends from the generator cable 210 and the battery cable 336 to the inverter 222 to provide the DC power from the generator 210 and the battery package 220 to the inverter 220 for conversion to AC power.

Operation of the power sharing connection 316 is as follows. In response to a need for power by the accessory system 50, for example if the system requires operation of the evaporation system, the controller 226 provides a number of output signals. A power sharing switch 346 signal is provided to the power sharing switch 340 to open the power sharing switch 340; a transfer switch signal 250 is provided to the transfer switch 224 indicating the power is to be provided from the inverter 222 to the contactors 228a, 228b, 228c; a first contactor signal 250 is provided to close the first contactor 228a; and a demand signal 248 is provided from the controller 226 to the inverter 222 to activate the inverter 222.

When the operation of the evaporation system is initiated, a very high start-up demand is placed upon the integrated power system 300. Because the power sharing switch 340 is initially open, this start-up demand is met by the battery package 220 without contribution from the generator 210. A continuous supply of DC power from the battery package 220, however, would eventually deplete the battery package 220, therefore, after start up, e.g after a delay of approximately two seconds, the power sharing switch 340 is closed and in addition to receiving DC power from the battery package 220, the inverter will also receive DC power from the generator 210. By isolating the generator 210 from the inverter during start-up, excessive loading of the engine 14 is avoided.

While preferred embodiments of the present invention are shown and described, it is envisioned that those skilled in the art may devise various modifications of the present invention without departing from the spirit and scope of the appended claims.

The invention claimed is:

1. An integrated power system for powering a vehicle accessory comprising:
    a contactor for providing AC power from the integrated power system to the vehicle accessory;
    a power sharing connection;
    a battery package for providing DC power to said power sharing connection;
    a generator for providing DC power to said power sharing connection and said battery package;
    an inverter in electrical communication with said power sharing connection,
    wherein said inverter converts DC power from said generator and said battery package to AC power;
    a utility grid connection;
    a transfer switch in communication with said inverter and with said utility grid connection, said transfer switch providing electrical isolation of said inverter from said utility grid connection, said transfer switch having a first mode of operation wherein said inverter is in electrical communication with said contactor so that said inverter delivers AC power to said contactor and a second mode of operation wherein said utility grid connection is in electrical communication with said contactor so that said utility grid connection delivers AC power to said contactor; and
    a controller in communication with said inverter, said transfer switch and said utility grid connection, said controller provides a demand signal to said inverter for activating and deactivating said inverter, and said controller provides a transfer switch signal to said transfer switch to place said transfer switch in either said first mode of operation or said second mode of operation.

2. The apparatus of claim I, wherein said controller receives a utility grid connection signal from said utility grid connection and in response a signal is provided to said transfer switch to place said transfer switch in said second mode of operation.

3. The apparatus of claim 1, wherein said power sharing connection comprises:
    a DC power bus for proving DC power to said inverter;
    a generator cable extending from an output of said generator to said DC power bus;
    a battery cable extending from said battery package to said DC power bus; and
    wherein the resistance of said generator cable is greater than the resistance of said battery cable.

4. The apparatus of claim 3, wherein the diameter of the battery cable is larger than the diameter of the generator cable.

5. The apparatus of claim 1, wherein the power sharing connection comprises:
    a DC power bus for providing DC power to said inverter;
    a generator cable extending from an output of said generator to said DC power bus and a power sharing switch between the generator and the DC power bus;
    a battery cable extending from said battery package to said DC power bus;
    wherein when said power sharing switch is in an open position said generator is electrically isolated from said inverter and when said power switch is in a closed position said inverter is in electrical communication with said generator.

6. The apparatus of claim 5, wherein said controller provides a power sharing switch signal to said power sharing switch to place said power sharing switch in either said open position or said closed position.

7. The apparatus of claim 6, wherein in response to a demand for power to the accessory, said controller provides a power sharing switch signal to said power sharing switch and said power sharing switch is opened in response to said power sharing switch signal, said controller provides a demand signal to said inverter and said inverter is activated in response to said demand signal, and subsequently a power sharing switch signal is provided to said power sharing switch to close said power sharing switch.

8. The apparatus of claim 5, wherein said power sharing connection further includes a stabilization battery in electrical communication with said output of said generator.

9. The apparatus of claim 1, further including a charger in electrical communication with said utility grid connection and in electrical communication with said battery package and wherein AC power is provided to said battery package via said charger.

10. The apparatus of claim 1, wherein said battery package is provided by conventional batteries.

11. The apparatus of claim 1, wherein said battery package is provided by a capacitor.

12. The apparatus of claim 1, further comprising first and second contactors in communication with said transfer switch and said vehicle accessory, and wherein said controller provides a first contactor signal to said first contactor to open or close said first contactor and wherein said controller provides a second contactor signal to said second contactor to open or close said second contactor.

13. The apparatus of claim 1, wherein said generator is directly attached to the transmission of a vehicle.

14. The apparatus of claim 1, further comprising a power take off device, a speed change attached to said power take off device and said generator is attached to said speed changer.

15. An integrated power system for powering a vehicle refrigeration system including an evaporation system comprising:
    a contactor for providing AC power from the integrated power system to the evaporation system the vehicle accessory;
    a power sharing connection;
    a battery package for providing DC power to said power sharing connection;
    a generator for providing DC power to said power sharing connection and said battery package;

an inverter in electrical communication with said power sharing connection, wherein said inverter converts DC power from said generator and said battery package to AC power;
a utility grid connection;
a transfer switch in communication with said inverter and with said utility grid connection, said transfer switch providing electrical isolation of said inverter from said utility grid connection, said transfer switch having a first mode of operation wherein said inverter is in electrical communication with said contactor so that said inverter delivers AC power to said contactor and a second mode of operation wherein said utility grid connection is in electrical communication with said contactor so that said utility grid connection delivers AC power to said contactor; and
a controller in communication with said inverter, said transfer switch and said utility grid connection, said controller provides a demand signal to said inverter for activating and deactivating said inverter, and said controller provides a transfer switch signal to said transfer switch to place said transfer switch in either said first mode of operation or said second mode of operation.

16. The integrated power system of claim 15, wherein said refrigeration system includes a defroster, the integrated power system further comprising:
a second contactor in communication with said transfer switch and said defroster.

17. The integrated power system of claim 15, wherein said refrigeration system includes a heater, the integrated power system further comprising:
a third contactor in communication with said transfer switch and said defroster.

18. A method of powering a vehicle accessory associated with a vehicle said method comprising the steps of:
providing an integrated power system for powering a vehicle accessory comprising:
a contactor in communication with said vehicle accessory for providing AC power from the integrated power system to the vehicle accessory;
a power sharing connection;
a generator for providing DC power to said power sharing connection;
a battery package for providing DC power to said power sharing connection;
an inverter in electrical communication with said power sharing connection, wherein said inverter converts DC power provided to said power sharing connection from said generator and said battery package to AC power;
a transfer switch in communication with said inverter and with a utility grid connection, said transfer switch providing electrical isolation of said inverter from said utility grid connection, said transfer switch having a first mode of operation wherein said inverter is in electrical communication with said contactor so that said inverter delivers AC power to said contactor and a second mode of operation wherein said utility grid connection is in electrical communication with said contactor so that said utility grid connection delivers AC power to said contactor; and
a controller in communication with said inverter, said transfer switch and said utility grid connection,
providing a call for power signal to said controller indicating a need for power to be supplied to the accessory;
in response to said call for power signal, providing a demand signal from said controller to said inverter to activate said inverter;
in response to said call for power signal, providing a transfer switch signal to said transfer switch to place said transfer switch in a first mode of operation;
upon activation of said inverter, converting DC power received from said power sharing connection to AC power; and
providing said AC power to said contactor through said transfer switch.

* * * * *

UNITED STATES PATENT AND TRADEMARK OFFICE
CERTIFICATE OF CORRECTION

PATENT NO.           : 9,126,544 B2                                        Page 1 of 1
APPLICATION NO.      : 12/875378
DATED                : September 8, 2015
INVENTOR(S)          : G. Larson et al.

It is certified that error appears in the above-identified patent and that said Letters Patent is hereby corrected as shown below:

In the specification

Column 1, line 49, please change "large and heave" to -- large and heavy --
Column 2, lines 64, 65, please change "cost efficient" to -- cost-efficient --
Column 3, line 18, please change "as will be" to -- as will be --
Column 3, line 59, please change "system 220." to -- system 200. --
Column 4, line 15, please change "switch 221" to -- switch 224 --
Column 4, line 20, please change "charger 231" to -- charger 232 --
Column 4, line 39, please change "charger 231" to -- charger 232 --
Column 5, line 21, please change "compartment 34" to -- compartment 36 --
Column 5, lines 22, 23, please change "compartment 34." to -- compartment 36. --
Column 5, line 47, please change "connector 30" to -- connector 230 --
Column 6, lines 16, 17, please change "contactor 252" to -- contactor 228b --
Column 6, line 35, please change "charger 231" to -- charger 232 --
Column 6, line 62, please change "made the" to -- made to the --
Column 6, line 63, please change "will he made" to -- will be made --
Column 6, line 66, please change "required. to" to -- required to --
Column 9, line 46, please change "example is a" to -- example in a --
Column 10, line 53, please change "cable 334" to -- cable 336 --
Column 10, line 57, please change "inverter 220" to -- inverter 222 --

Signed and Sealed this
Nineteenth Day of April, 2016

Michelle K. Lee
*Director of the United States Patent and Trademark Office*